US011619205B2

(12) United States Patent
Sato et al.

(10) Patent No.: US 11,619,205 B2
(45) Date of Patent: Apr. 4, 2023

(54) WIND TURBINE BLADE AND WIND TURBINE POWER GENERATING APPARATUS

(71) Applicant: Vestas Wind Systems A/S, Aarhus N (DK)

(72) Inventors: Kenji Sato, Aarhus N (DK); Masayuki Hiraishi, Aarhus N (DK)

(73) Assignee: Vestas Wind Systems A/S, Aarhus N (DK)

( * ) Notice: Subject to any disclaimer, the term of this patent is extended or adjusted under 35 U.S.C. 154(b) by 299 days.

(21) Appl. No.: 16/606,366

(22) PCT Filed: Apr. 26, 2017

(86) PCT No.: PCT/EP2017/059942
§ 371 (c)(1),
(2) Date: Oct. 18, 2019

(87) PCT Pub. No.: WO2018/196967
PCT Pub. Date: Nov. 1, 2018

(65) Prior Publication Data
US 2021/0332788 A1 Oct. 28, 2021

(51) Int. Cl.
*F03D 1/06* (2006.01)
*F03D 80/30* (2016.01)

(52) U.S. Cl.
CPC .......... *F03D 1/0675* (2013.01); *F03D 80/30* (2016.05); *F05B 2230/90* (2013.01);
(Continued)

(58) Field of Classification Search
CPC .......... F03D 1/0675; F03D 1/06; F03D 80/30; F03D 80/00; F05B 2230/00;
(Continued)

(56) References Cited

U.S. PATENT DOCUMENTS 5,474,425 A * 12/1995 Lawlor ................... F03D 1/065
416/223 R
2009/0139739 A1 6/2009 Hansen
(Continued)

FOREIGN PATENT DOCUMENTS

CN 101336342 A 12/2008
DE 102015200370 A1 * 7/2015 ............. F03D 80/30
(Continued)

OTHER PUBLICATIONS

Office Action for Japanese Application No. 2019555693 dated Oct. 6, 2020; 8pp.
(Continued)

*Primary Examiner* — Brian P Wolcott
*Assistant Examiner* — Eric A Lange
(74) *Attorney, Agent, or Firm* — Wood Herron & Evans LLP

(57) ABSTRACT

A wind turbine blade includes: a metal receptor including a blade tip of the wind turbine blade; and a blade body portion connected to the metal receptor so as to be positioned on a blade-root side of the metal receptor, the blade body portion having a hollow structure and forming an airfoil shape in a blade tip region of the wind turbine blade with the metal receptor in a joint region to the metal receptor. As seen in a blade-thickness direction of the wind turbine blade, a tangent to a joint line between the metal receptor and the blade body portion at an intersection between the joint line and a leading edge of the wind turbine blade is inclined from a chordwise direction of the wind turbine blade.

22 Claims, 10 Drawing Sheets

(52) U.S. Cl.
CPC . *F05B 2280/105* (2013.01); *F05B 2280/1072* (2013.01); *F05B 2280/6003* (2013.01)

(58) Field of Classification Search
CPC .......... F05B 2230/30; F05B 2280/6011; F05B 2240/302; F05B 2230/80; F05B 2230/60; F05B 2260/95; F05B 2230/90; F05B 2280/1072; F05B 2280/6003; F05B 2280/105
See application file for complete search history.

(56) References Cited

U.S. PATENT DOCUMENTS

| | | | |
|---|---|---|---|
| 2010/0329881 A1* | 12/2010 | Mendez Hernandez | ................... B64D 45/02 174/2 |
| 2014/0186175 A1 | 7/2014 | Baehmann et al. | |
| 2014/0191082 A1 | 7/2014 | Figueroa-Karlstroem | |
| 2014/0341738 A1* | 11/2014 | Bech | ....................... F03D 80/30 416/146 R |
| 2016/0177915 A1 | 6/2016 | Gonzalez et al. | |

FOREIGN PATENT DOCUMENTS

| | | | | |
|---|---|---|---|---|
| DE | 102015200370 | A1 | 7/2015 | |
| EP | 2226497 | A1 | 9/2010 | |
| EP | 2267280 | A2 | 12/2010 | |
| EP | 2789581 | A1 | 10/2014 | |
| EP | 2789851 | A1 * | 10/2014 | ........... F03D 1/0675 |
| GB | 2527035 | A | 12/2015 | |
| JP | 2013545061 | A | 12/2013 | |
| JP | 2014148984 | A | 8/2014 | |
| JP | 5730408 | B | 6/2015 | |
| WO | 2011080177 | A1 | 7/2011 | |
| WO | WO-2011080177 | A1 * | 7/2011 | ........... F03D 1/0675 |
| WO | WO-2013007267 | A1 * | 1/2013 | ........... F03D 1/0675 |
| WO | 2013084634 | A1 | 6/2013 | |

OTHER PUBLICATIONS

ISR for PCT/EP2017/059942 dated Dec. 19, 2017; 14 pp.
Written Opinion for PCT/EP2017/059942 dated Mar. 25, 2019; 6 pp.
IPER for PCT/EP2017/059942 dated Jul. 29, 2019; 17 pp.
Office Action for Chinese Application No. 201780089907.1 dated Jul. 20, 2020; 19pp.
China National Intellectual Property Administration, Decision of Rejection in CN Application No. 201780089907.1, dated Jan. 6, 2022.

* cited by examiner

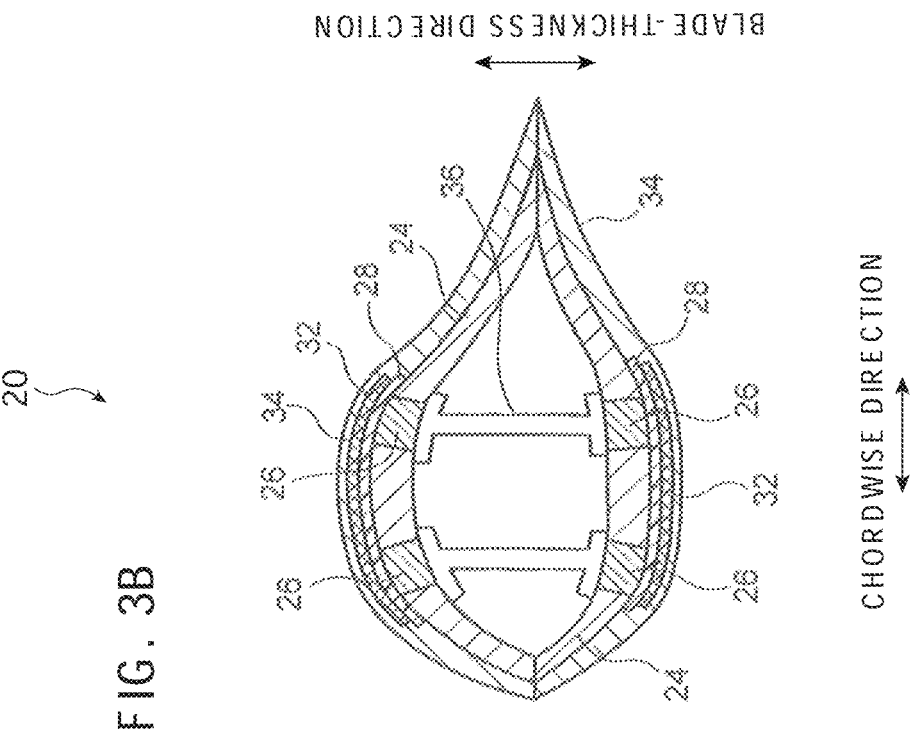
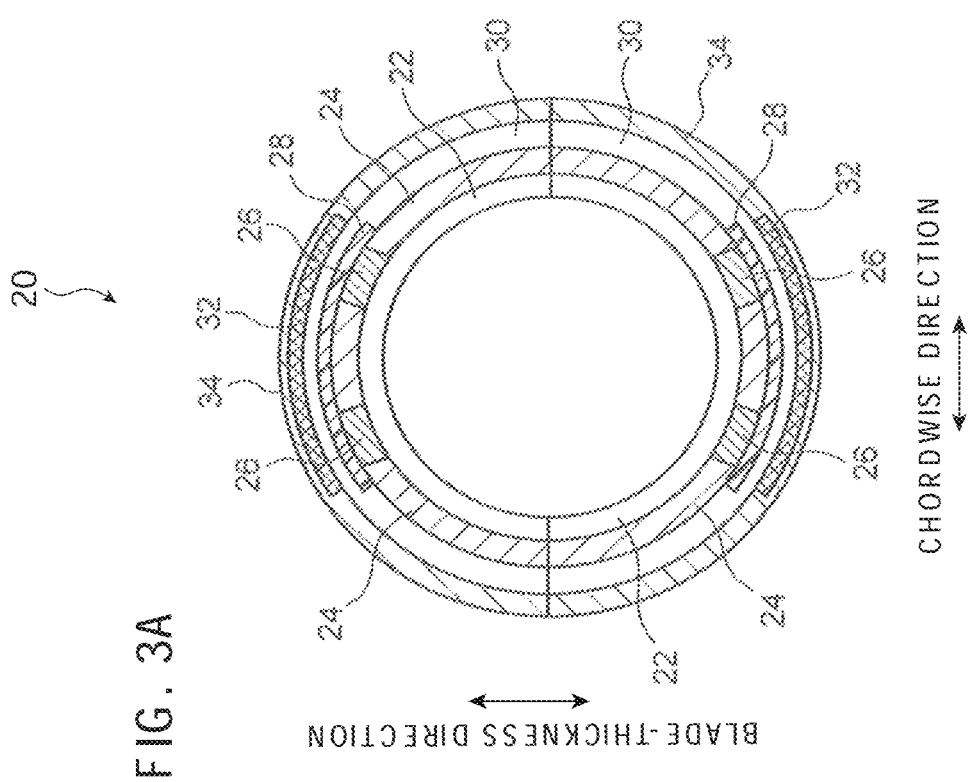

WIND TURBINE BLADE AND WIND TURBINE POWER GENERATING APPARATUS

RELATED APPLICATIONS

The present application is a National Phase of International Application Number PCT/EP2017/059942 filed Apr. 26, 2017.

TECHNICAL FIELD

The present invention relates to a wind turbine blade and a wind turbine power generating apparatus.

BACKGROUND ART

Typically, a wind turbine blade is provided with a lightning protection facility for reducing damage to a blade body from lightning strikes. For instance, Patent Document 1 discloses a wind turbine blade including a metal receptor (lightning receiving portion) on a blade tip.

CITATION LIST

Patent Literature

Patent Document 1: EP2226497A

SUMMARY

Problems to be Solved

A wind turbine blade gets hit by foreign substances in the air (e.g. raindrops, dusts) when a rotor rotates, and the collision results in occurrence of erosion on a leading-edge side of the wind turbine blade. In particular, if a foreign substance hits a joint portion between a blade body portion and a receptor, cracks may develop on the blade body portion starting from the leading-edge side of the joint portion.

An object of at least some embodiments of the present invention is to suppress erosion damage to a wind turbine blade.

Solution to the Problems (1) A wind turbine blade according to at least one embodiment of the present invention comprises: a metal receptor including a blade tip of the wind turbine blade; and a blade body portion connected to the metal receptor so as to be positioned on a blade-root side of the metal receptor, the blade body portion having a hollow structure and forming an airfoil shape in a blade tip region of the wind turbine blade with the metal receptor in a joint region to the metal receptor. As seen in a blade-thickness direction of the wind turbine blade, a tangent to a joint line between the metal receptor and the blade body portion at an intersection between the joint line and a leading edge of the wind turbine blade is inclined from a chordwise direction of the wind turbine blade.

With the above configuration (1), the joint surface between the metal receptor and the blade body portion having a hollow structure is inclined from the chordwise direction, and thereby the collision angle formed by a foreign substance (e.g. raindrops, dusts) with the leading edge of the wind turbine blade is not the same as the tangent direction of the joint surface. Accordingly, it is possible to mitigate concentration of shock on the joint portion when a foreign substance hits the wind turbine blade, and thereby to suppress erosion on the joint surface and erosion damage to the wind turbine blade.

It is especially effective to suppress erosion on the joint surface between the metal receptor and the blade body portion in a case where the blade body portion has a "hollow structure". That is, in a case where the blade body portion has a hollow structure, development of erosion on the joint surface between the metal receptor and the blade body portion may bring about formation of a communication path that connects inside and outside of the wind turbine blade, which may let through foreign substances into the inside (hollow section) of the blade body portion. In this context, it is technically beneficial to be able to suppress erosion on the joint surface as described above.

In the present specification, "blade-thickness direction" refers to a direction perpendicular to both of the blade spanwise direction and the chordwise direction of the wind turbine blade.

(2) In some embodiments, in the above configuration (1), as seen in the blade-thickness direction of the wind turbine blade, the joint line may be curved or bended so that an intersection between the joint line and a trailing edge of the wind turbine blade is positioned closer to the blade tip than an intersection between the tangent and the trailing edge of the wind turbine blade.

With the above configuration (2), the joint line between the metal receptor and the blade body portion having a hollow structure may have a non-linear shape from the leading edge to the trailing edge in a range where the intersection between the joint line and the trailing edge of the wind turbine blade is closer to the blade tip than the intersection between the tangent and the trailing edge of the wind turbine blade. Accordingly, it is possible to improve the design flexibility of the shape of the joint portion between the metal receptor and the blade body portion, and thereby it is possible to select a shape for the metal receptor from among a variety of shapes to reduce erosion damage to the wind turbine blade more appropriately.

(3) In some embodiments, in the above configuration (1) or (2), the tangent may be inclined from the chordwise direction so as to get closer to the blade tip with distance from the leading edge toward the trailing edge of the wind turbine blade.

With this configuration (3), the metal receptor is disposed on the leading-edge side of the joint line, and thereby it is possible to protect the joint surface from collision with a foreign substance associated with rotation of the wind turbine blade, and to suppress erosion on the joint line effectively.

(4) In some embodiments, in any one of the above configurations (1) to (3), a length of the metal receptor along a blade spanwise direction may be at least 0.1% and not more than 0.9% of a blade length of the wind turbine blade, or at least 50 mm and not more than 700 mm.

With the above configuration (4), the length of the metal receptor is at least 0.1% of the blade length, or at least 50 mm, and thus the metal receptor can exert a high lightning-protection performance. Furthermore, with the length of the metal receptor being at most 0.9% of the blade length, or at most 700 mm, it is possible to suppress a weight increase of the wind turbine blade associated with a size increase of the metal receptor.

(5) In some embodiments, in any one of the above configurations (1) to (4), a width of the metal receptor along the chordwise direction may be at least 0.25% and not more than 0.9% of a blade length of the wind turbine blade, or at least 200 mm and not more than 700 mm.

With the above configuration (5), the width of the metal receptor is at least 0.25% of the blade length, or at least 200 mm, and thus the metal receptor can exert a high lightning-protection performance. Furthermore, with the width of the metal receptor being at most 0.9% of the blade length, or at most 700 mm, it is possible to suppress a weight increase of the wind turbine blade associated with a size increase of the metal receptor.

(6) In some embodiments, in any one of the above configurations (1) to (5), the joint line may have a curved shape with a curvature radius of not more than 0.009 L, provided that L is a blade length of the wind turbine blade.

With the above configuration (6), the joint line has a curved shape, which makes it possible to ensure a sufficient inclination angle between the chordwise direction and the tangent to the joint line at the intersection between the leading edge and the joint line while suppressing concentration of the weight of the metal receptor toward the leading edge or toward the trailing edge, thus suppressing erosion at the joint line effectively.

(7) In some embodiments, in any one of the above configurations (1) to (6), the wind turbine blade may further comprise a first anti-erosion layer covering at least a part of an outer surface of the blade body portion.

With the above configuration (7), the first anti-erosion layer is provided to cover at least a part of the outer surface of the blade body portion, and thereby it is possible to suppress erosion damage to the wind turbine blade more effectively.

(8) In some embodiments, in any one of the above configurations (1) to (7), the wind turbine blade may further comprise a second anti-erosion layer covering at least a portion of the joint line between the metal receptor and the blade body portion, the portion being disposed on a side of the leading edge.

With the above configuration (8), the second anti-erosion layer is additionally provided, and thereby it is possible to cover the leading-edge side portion of the joint line between the metal receptor and the blade body portion. Accordingly, it is possible to suppress erosion on the joint surface even more effectively.

(9) In some embodiments, in any one of the above configurations (1) to (8), the wind turbine blade may further comprise a lightning-current transmission part including at least one of: a metal foil which is connected to the metal receptor and which extends from a connection section to the metal receptor toward a blade root of the wind turbine blade; or a down-conductor.

With the above configuration (9), the wind turbine blade further includes the lightning-current transmission part including at least one of the metal foil or the down-conductor, and thereby it is possible to exert the lightning-protection performance more reliably while achieving the effect to suppress erosion damage to the wind turbine blade described in the above (1).

(10) In some embodiments, in any one of the above configurations (1) to (9), the blade body portion may include an FRP shell which is connected to the metal receptor while overlapping the metal receptor.

With the above configuration (10), it is possible to achieve the effect to suppress erosion damage to the wind turbine blade described in the above (1), at the connection section between the metal receptor and the FRP shell having a hollow structure and being formed of FRP.

(11) In some embodiments, in any one of the above configurations (1) to (9), the metal receptor may have a cavity inside the metal receptor.

With the above configuration (11), the metal receptor has the cavity formed therein, and thereby it is possible to suppress a weight increase of the metal receptor while suppressing erosion on the joint line.

(12) In some embodiments, in the above configuration (11), the metal receptor may include a drain hole which is in communication with the cavity.

With this configuration (12), the metal receptor has the drain hole communicating with the cavity formed inside the metal receptor, and thereby it is possible to discharge foreign substances like raindrops that accumulate inside the cavity to outside through the drain hole, and to suppress erosion damage to the wind turbine blade.

(13) In some embodiments, in any one of the above configurations (1) to (11), the metal receptor may include: a first portion forming a pressure surface on a side of the blade tip of the wind turbine blade; and a second portion forming a suction surface on the side of the blade tip of the wind turbine blade, the second portion being fastened to the first portion.

With the above configuration (13), the metal receptor includes the first portion forming the pressure surface on the side of the blade tip and the second portion forming the suction surface on the side of the blade tip, and thereby it is possible to facilitate assembly and maintenance works of the blade body portion while achieving the effect to suppress erosion damage to the wind turbine blade described in the above (1).

(14) In some embodiments, in any one of the above configurations (1) to (13), the metal receptor may comprise copper or copper alloy.

With the above configuration (14), the metal receptor includes copper or copper alloy having a high conductivity, and thereby it is possible to exert the lightning-protection performance more reliably while achieving the effect to suppress erosion damage to the wind turbine blade described in the above (1).

(15) A wind turbine power generating apparatus according to at least some embodiments of the present invention may comprise the wind turbine blade according to any one of the above (1) to (14).

With the above configuration (15), it is possible to provide a wind turbine power generating apparatus including a wind turbine blade whereby it is possible to suppress erosion at the joint surface effectively.

Advantageous Effects

According to at least one embodiment of the present invention, it is possible to suppress erosion damage to a wind turbine blade.

BRIEF DESCRIPTION OF DRAWINGS

FIGS. 3A and 3B are cross-sectional views taken along lines A-A and B-B in FIG. 2, respectively.

DETAILED DESCRIPTION

Embodiments of the present invention will now be described in detail with reference to the accompanying drawings. It is intended, however, that unless particularly specified, dimensions, materials, shapes, relative positions and the like of components described in the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

Figure 1:
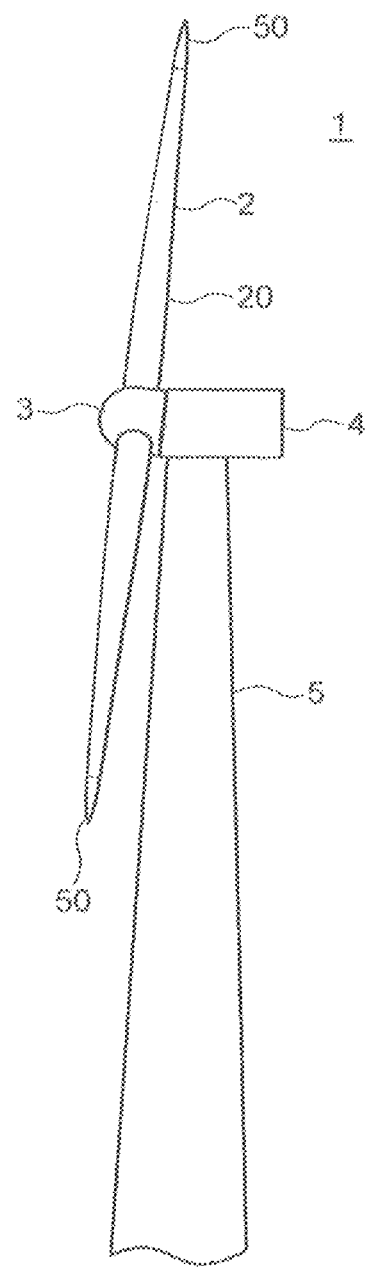
FIG. 1 is a diagram of a configuration example of a wind turbine power generating apparatus.
Figure 2:
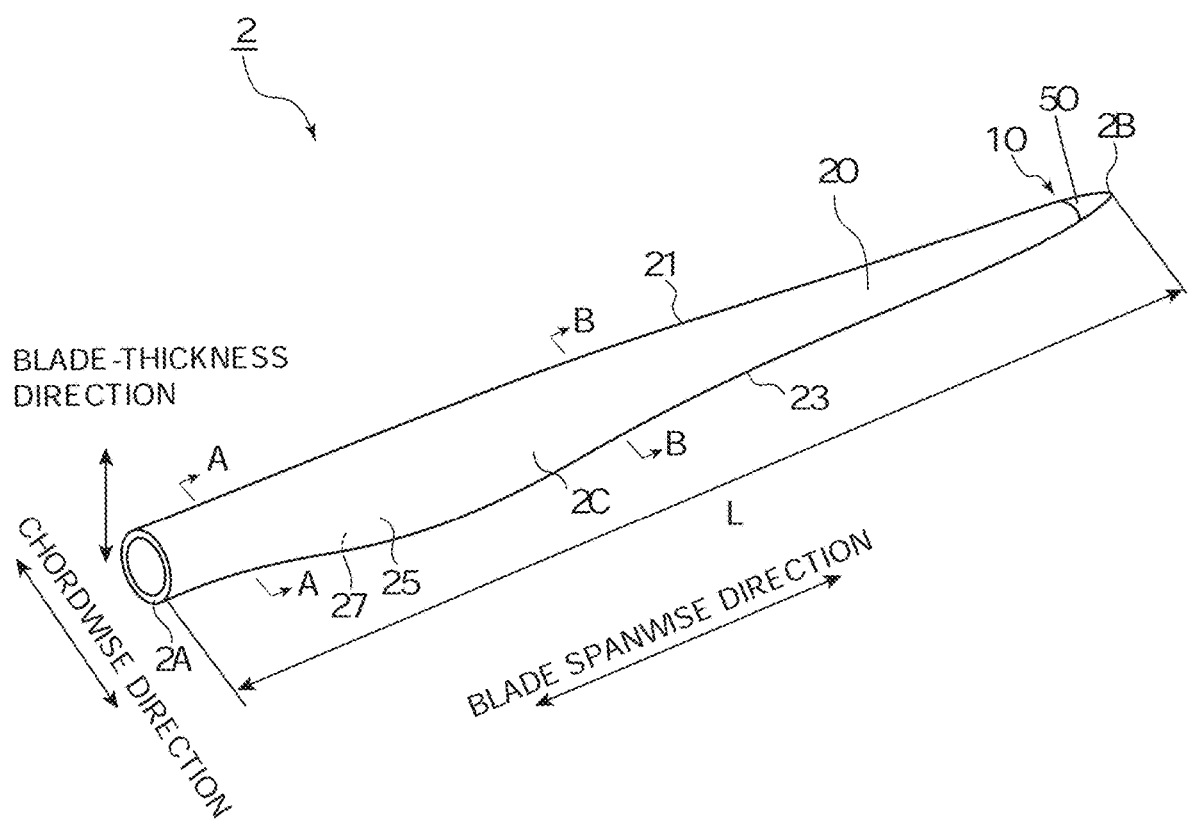
FIG. 2 is a perspective view of a wind turbine blade according to an embodiment.
Figure 4:
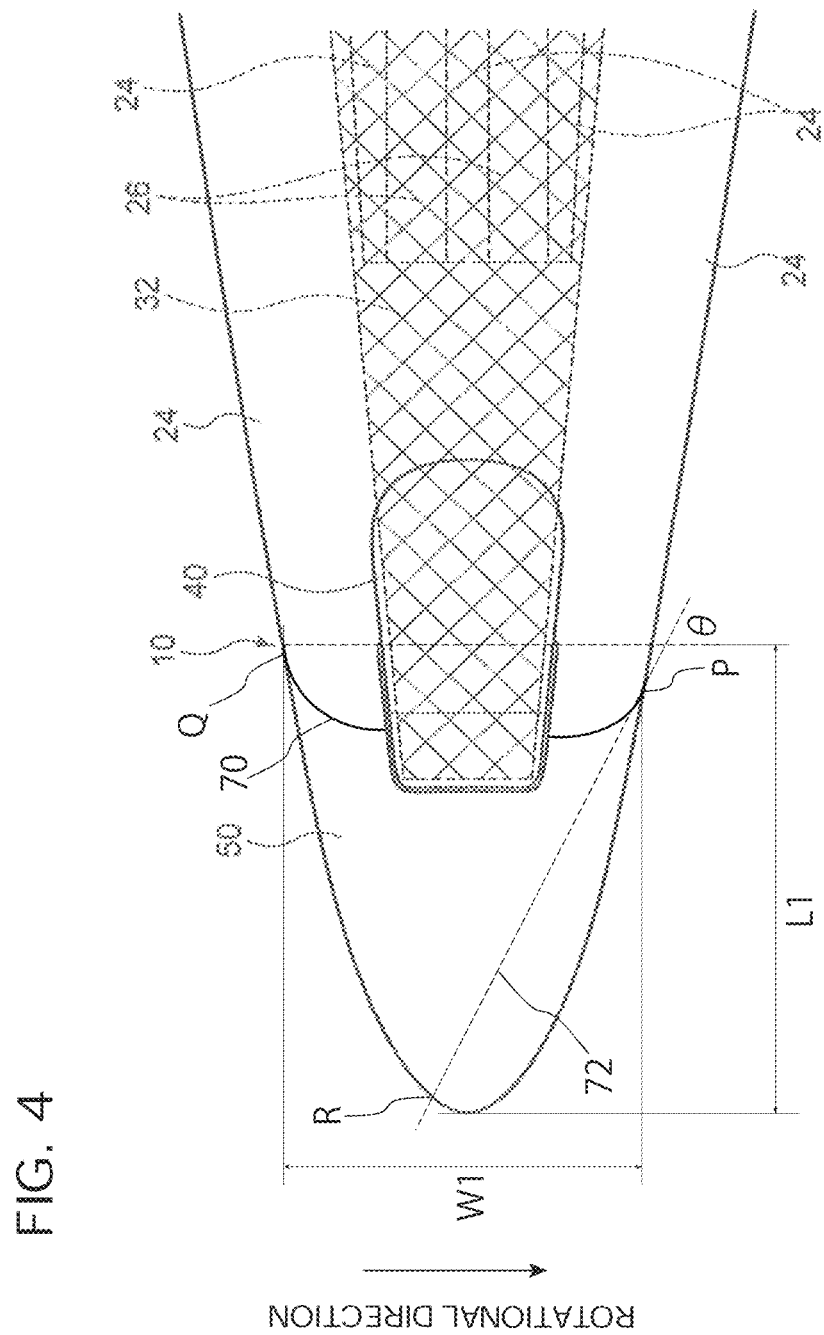
FIG. 4 is a planar view of a tip side of a wind turbine blade according to an embodiment.

FIG. 1 is a schematic diagram of a configuration example of a wind turbine power generating apparatus according to an embodiment. FIG. 2 is a perspective view of a wind turbine blade according to an embodiment. FIGS. 3A and 3B are cross-sectional views taken along lines A-A and B-B in FIG. 2, respectively. FIG. 4 is a planar view of a tip side of a wind turbine blade according to an embodiment.

As depicted in FIG. 1, according to at least one embodiment of the present invention, the wind turbine power generating apparatus (hereinafter, referred to as wind turbine) 1 includes at least one wind turbine blade 2, a hub 3 to which the wind turbine blade 2 is mounted, a nacelle 4 supporting a rotor including the wind turbine blade 2 and the hub 3, and a tower 5 which supports the nacelle 4 revolvably. Rotation of the rotor is inputted into a non-depicted generator, and the generator thereby generates electric power.

The tower 5 is disposed on ocean if the wind turbine power generating apparatus is an offshore type, and on a foundation on land if the wind turbine power generating apparatus is an onshore type.

As depicted in FIG. 2, the wind turbine blade 2 according to an embodiment includes a blade body portion 20 extending from a blade root portion 2A toward a blade tip portion 2B, and a metal receptor 50 including the blade tip portion 2B of the wind turbine blade 2.

As depicted in FIG. 2, the blade body portion 20 includes the blade root portion 2A to be attached to the hub 3 of the wind turbine 1, the blade tip portion 2B positioned farthest from the hub 3, and an airfoil portion 2C (blade center portion) extending between the blade root portion 2A and the blade tip portion 2B in the blade spanwise direction. Further, the blade body portion 20 has a leading edge 21 and a trailing edge 23 extending from the blade root portion 2A to the blade tip portion 2B. The contour of the blade body portion 20 is defined by a suction surface 25 and a pressure surface 27 defined across the leading edge 21 and the trailing edge 23 (see FIGS. 2 and 3).

In the present specification, "blade spanwise direction" refers to a direction connecting the blade root portion 2A and the blade tip portion 2B, and "chordwise direction (blade chordwise direction)" refers to a direction along a line (chord) connecting the leading edge 21 and the trailing edge 23 of the blade body portion 20. Further, "blade-thickness direction (flap direction)" refers to a direction substantially orthogonal to the chordwise direction connecting the leading edge 21 and the trailing edge 23, that is, a direction connecting the suction side and the pressure side of the blade body portion 20. (see FIGS. 2 and 3). Furthermore, "blade root portion" refers to a cylindrical portion of the wind turbine blade 2, which has a substantially circular cross section, extending in the blade spanwise directional range of 5 m, for instance, from the end surface on the side of the blade root portion 2A of the blade body portion 20 of the wind turbine blade 2 (typically, the range of 1 m to 3 m from the end surface).

In some embodiments, the blade body portion 20 is at least partially made of fiber-reinforced plastic (FRP). In some embodiments, as depicted in FIGS. 3 and 4, the wind turbine blade 2 may include a metal foil 32 extending along the blade spanwise direction toward the blade root portion 2A from a joint portion 10 between the metal receptor 50 and an end portion of the blade body portion 20. The metal foil 32 may be configured to guide lightning current from the metal receptor 50 toward the blade root portion 2A and may have a function of a down-conductor. In an embodiment, the metal foil 32 is electrically connected to another down-conductor passing through the blade root portion 2A, the hub 3, the nacelle 4, and the tower 5. When the metal receptor 50 receives lightning, the metal foil 32 may guide lightning current from the metal receptor 50 to an earth terminal mounted to the tower 5, via the other down-conductor.

As depicted in FIG. 2, in some embodiments, the blade body portion 20 is connected to the metal receptor 50 while being positioned on a side of the metal receptor 50 that is closer to the blade root portion 2A. In some embodiments, the blade body portion 20 has a hollow structure that forms an airfoil shape in the blade-tip region of the wind turbine blade 2, together with the metal receptor 50, in the joint region between the blade body portion 20 and the metal receptor 50.

Specifically, as shown in FIG. 3A, at the blade root portion 2A in an embodiment, the wind turbine blade 2 comprises an inner blade-root reinforcement member 22, an airfoil forming member 24 with sparcaps 26, an insulation layer 28, an outer blade-root reinforcement member 30, the metal foil 32, and a protection layer 34, arranged in this order from inside to outside in the thickness direction.

Furthermore, in an embodiment, as shown in FIG. 3B, at the airfoil portion 2C, the wind turbine blade 2 comprises the airfoil forming member 24 with the sparcaps 26, the insulation layer 28, the metal foil 32, and the protection layer 34, arranged in this order from inside to outside in the thickness direction.

In FIGS. 3A and 3B, the thickness and size of each member is depicted differently from the actual measurement of a wind turbine blade to simplify the explanation.

In some embodiments, the blade body portion 20 may be configured such that the suction surface 25 and the pressure surface 27 are joined to each other to form a single piece along the edge portion of each of the leading edge 21 and the trailing edge 23, as depicted in FIGS. 2, 3A and 3B. In some embodiments, in the wind turbine blade 2, the suction surface 25 and the pressure surface 27 may be coupled to each other via at least one shear web 36 (beam member) in the blade spanwise direction at respective inner surface sides. The shear web 36 may be disposed continuously from the blade root portion 2A to the vicinity of the end portion of the blade body portion 20. With the shear web 36 provided also on the tip side of the blade body portion 20, it is possible to support the loads increased by the metal receptor 50 with the shear web 36. The end portion of the blade body portion 20 is an end portion of the blade body portion 20 on the side of the blade tip portion 2B, having the metal receptor 50 connected thereto.

In some embodiments, the insulation layer 28 is interposed between the sparcaps 26 and the metal foil 32, and the insulation layer 28 insulates the sparcaps 26 from the metal foil 32. Accordingly, when the metal receptor 50 receives lightning, it is possible to prevent a strong lightning current from running to the sparcaps 26 from the metal foil 32 to damage the sparcaps 26.

As described above, the metal foil 32 extends along the blade spanwise direction toward the blade root portion 2A from the joint portion 10 between the metal receptor 50 and the end portion of the blade body portion 20. For instance, the metal foil 32 may have a sheet shape or a mesh shape, and may be made of copper or copper alloy.

As depicted in FIGS. 4 to 11, in some embodiments, when the wind turbine blade 2 is seen in the blade-thickness direction, the tangent 72 to a joint line 70 between the metal receptor 50 and the blade body portion 20 at an intersection P between the joint line 70 and a side of the leading edge 21 of the wind turbine blade 2 is inclined from the chordwise direction of the wind turbine blade 2 (inclination angle θ).

With the above configuration, the joint surface between the metal receptor 50 and the blade body portion 20 having a hollow structure is inclined from the chordwise direction, and thereby the collision angle of a foreign substance F (e.g. raindrops, dusts) formed with the leading edge 21 of the wind turbine blade 2 is not the same as the tangent direction of the joint surface. Accordingly, it is possible to mitigate concentration of shock on the joint portion upon collision of a foreign substance with the wind turbine blade 2, and thereby to suppress erosion on the joint surface and erosion damage to the wind turbine blade 2. It is possible to avoid perpendicular collision between the foreign substance F in the air and the leading edge 21 of the joint line 70 of the wind turbine blade 2, and thereby it is possible to mitigate concentration of shock on the joint portion 10 upon collision of the foreign substance F with the wind turbine blade 2, and to reduce erosion damage to the wind turbine blade 2.

Suppressing erosion as described above on the joint surface between the metal receptor 50 and the blade body portion 20 is effective particularly in a case where the blade body portion 20 has a "hollow structure" as in some embodiments. That is, in a case where the blade body portion 20 has a hollow structure, development of erosion on the joint surface between the metal receptor 50 and the blade body portion 20 may lead to formation of a communication path that connects inside and outside of the wind turbine blade 2, which may let through foreign substances into the inside (hollow section) of the blade body portion 20, and thus it is technically beneficial to be able to suppress erosion on the joint surface as described above.

Figure 5:
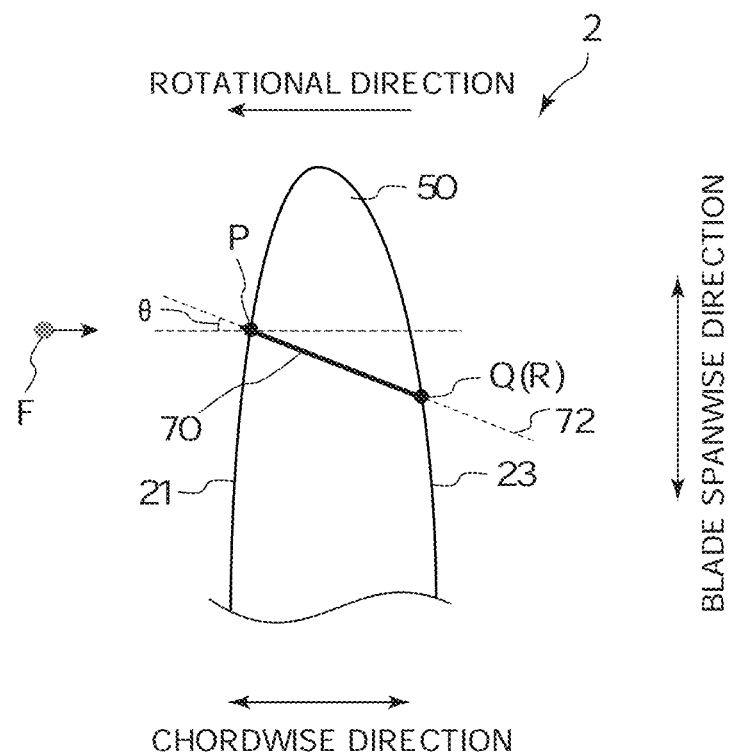
FIG. 5 is a diagram of a blade tip portion of a wind turbine blade according to an embodiment.
Figure 6:
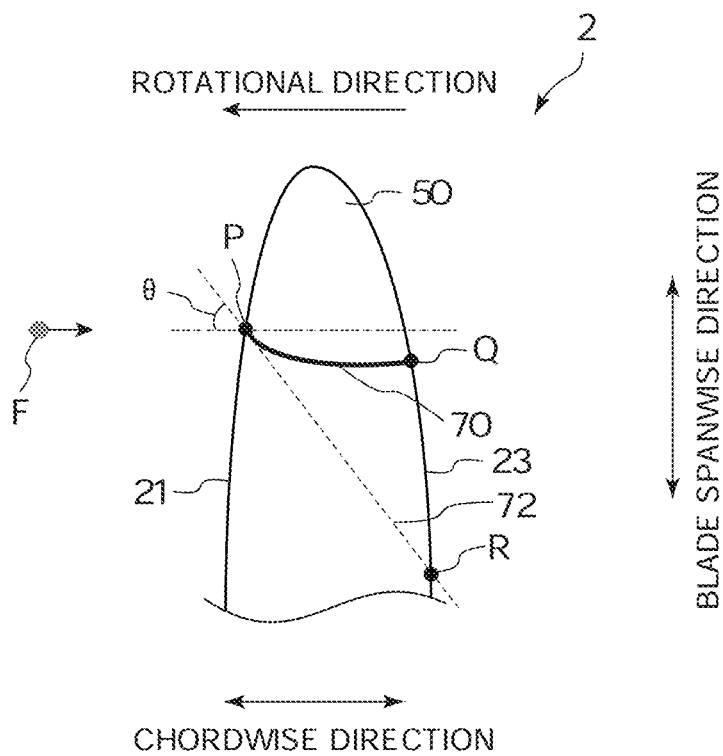
FIG. 6 is a diagram of a blade tip portion of a wind turbine blade according to another embodiment.

In some embodiments, for instance, as depicted in FIG. 5, the joint line 70 may have a linear shape so that intersection Q between the joint line 70 and the trailing edge 23 of the wind turbine blade 2 is at the same position as intersection R between the tangent 72 and the trailing edge 23 of the wind turbine blade 2, when seen in the blade-thickness direction of the wind turbine blade 2. In some embodiments, for instance, as depicted in FIG. 6, the joint line 70 may have a curved shape so that intersection Q between the joint line 70 and the trailing edge 23 of the wind turbine blade 2 is positioned closer to the blade tip 2B than intersection R between the tangent 72 and the trailing edge 23 of the wind turbine blade 2, when seen in the blade-thickness direction of the wind turbine blade 2. Furthermore, in some embodiments, for instance, as depicted in FIG. 7, the joint line 70 may have a bended shape so that intersection Q between the joint line 70 and the trailing edge 23 of the wind turbine blade 2 is positioned closer to the blade tip 2B than intersection R between the tangent 72 and the trailing edge 23 of the wind turbine blade 2.

With the above configuration, the joint line 70 between the metal receptor 50 and the blade body portion 20 having a hollow structure may have a non-linear shape from the leading edge 21 to the trailing edge 23 within a range where intersection Q between the joint line 70 and the trailing edge 23 of the wind turbine blade 2 is closer to the blade tip portion 2B than intersection R between the tangent 72 and the trailing edge 23 of the wind turbine blade 2. Accordingly, it is possible to improve the design flexibility of the shape of the joint portion 10 between the metal receptor 50 and the blade body portion 20, and thereby it is possible to select a shape for the metal receptor 50 from among a variety of shapes to reduce erosion damage to the wind turbine blade 2 more suitably with the receptor 50.

Figure 7:
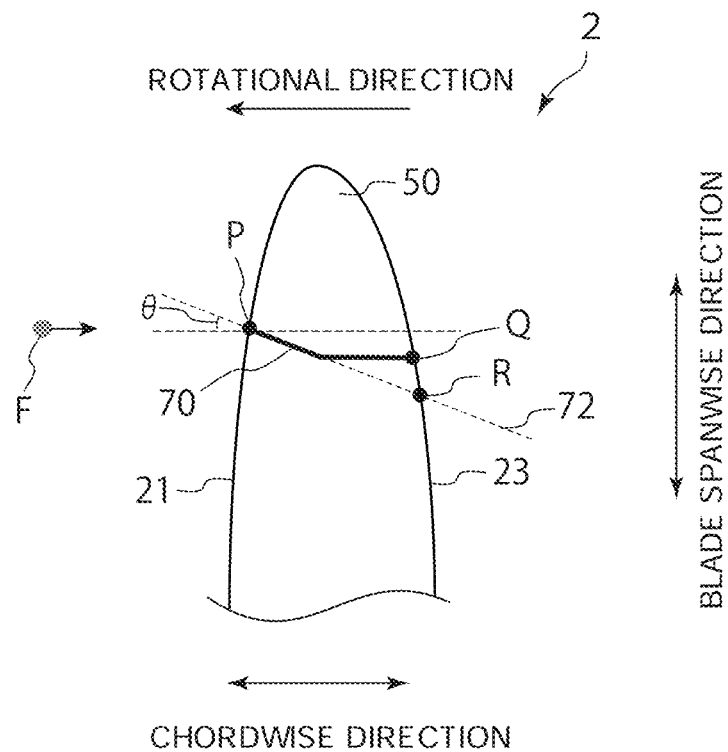
FIG. 7 is a diagram of a blade tip portion of a wind turbine blade according to another embodiment.

In the exemplary embodiment depicted in FIGS. 5 to 7, any one of intersection P between the joint line 70 and the leading edge 21 or intersection Q between the joint line 70 and the trailing edge 23 may be positioned closer to the blade tip portion 2B. In other words, intersection P may be disposed closer to the blade tip portion 2B than intersection Q, or intersection Q may be disposed closer to the blade tip portion 2B than intersection P. Further, intersection R between the tangent 72 and the trailing edge 23 may be disposed closer to the blade root portion 2A than a chord passing through intersection P, or may be closer to the tip portion 2B than the chord.

Figure 9:
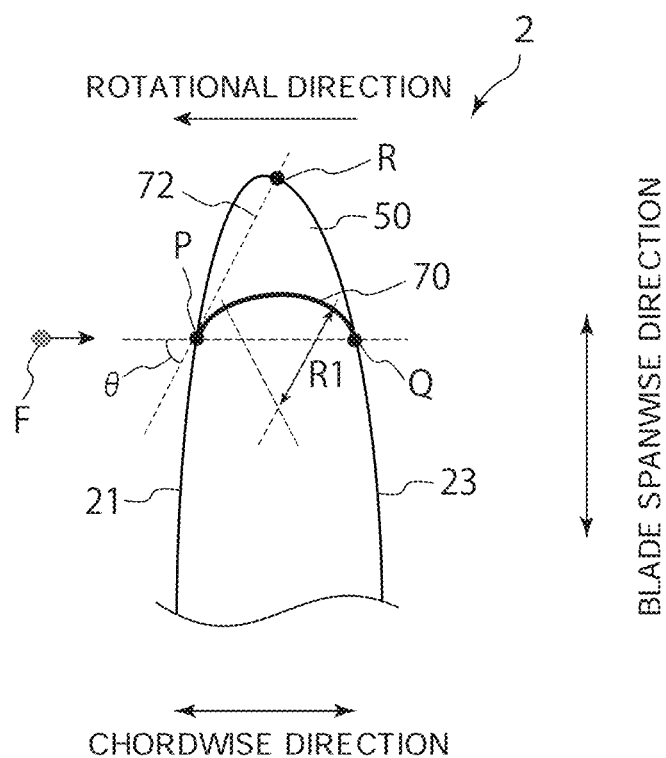
FIG. 9 is a diagram of a blade tip portion of a wind turbine blade according to another embodiment.
Figure 10:
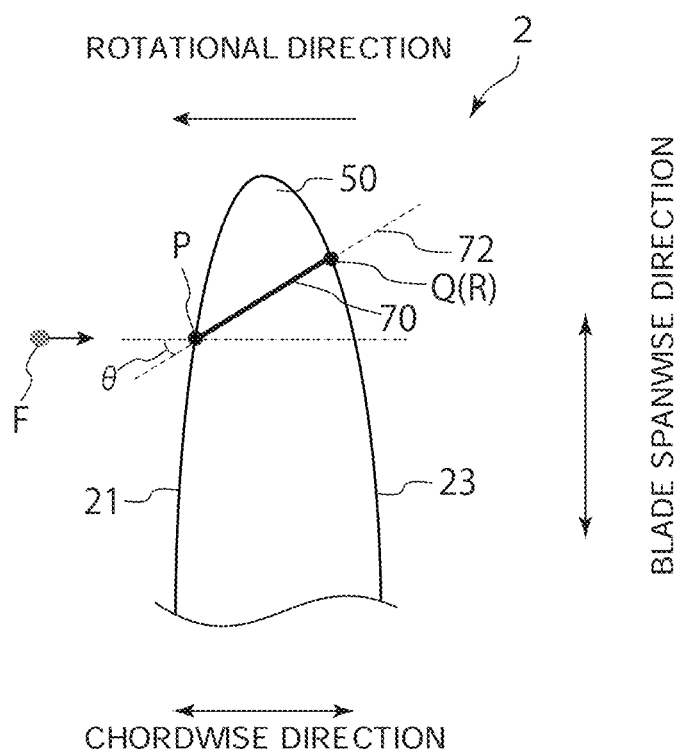
FIG. 10 is a diagram of a blade tip portion of a wind turbine blade according to another embodiment.

In some embodiments, as depicted in FIG. 4, 9, or 10, the tangent 72 may be inclined from the chordwise direction so that the tangent 72 extends closer to the blade tip portion 2B with distance from the leading edge 21 toward the trailing edge 23 of the wind turbine blade 2. With this configuration, it is the metal receptor 50 that is disposed on the side of the leading edge 21 of the joint line 70, and thus it is possible to effectively suppress erosion on the joint line 70.

In some embodiments, the length L1 of the metal receptor 50 along the blade spanwise direction may be at least 0.1% and not more than 0.9% of the blade length L of the wind turbine blade 2 (0.001 L≤L1≤0.009 L), or maybe at least 50 mm and not more than 700 mm (50 mm≤L1≤700 mm) (see FIGS. 2 and 4). Accordingly, with the length of the metal receptor 50 being at least 0.1% of the blade length, or at least 50 mm, the metal receptor 50 can exert a high lightning-protection performance. Furthermore, with the length of the metal receptor 50 being not more than 0.9% of the blade length, or not more than 700 mm, it is possible to suppress a weight increase of the wind turbine blade 2 associated with a size increase of the metal receptor 50.

In some embodiments, the width W1 of the metal receptor 50 along the chordwise direction may be at least 0.25% and not more than 0.9% of the blade length L of the wind turbine blade 2 (0.0025 L≤W1≤0.009 L), or maybe at least 200 mm and not more than 700 mm (200 mm≤L1≤700 mm) (see FIGS. 2 and 4). Accordingly, with the width of the metal receptor 50 being at least 0.25% of the blade length, or at least 200 mm, the metal receptor 50 can exert a high lightning-protection performance. Furthermore, with the width of the metal receptor 50 being not more than 0.9% of the blade length or not more than 700 mm, it is possible to suppress a weight increase of the wind turbine blade 2 associated with a size increase of the metal receptor 50.

Figure 8:
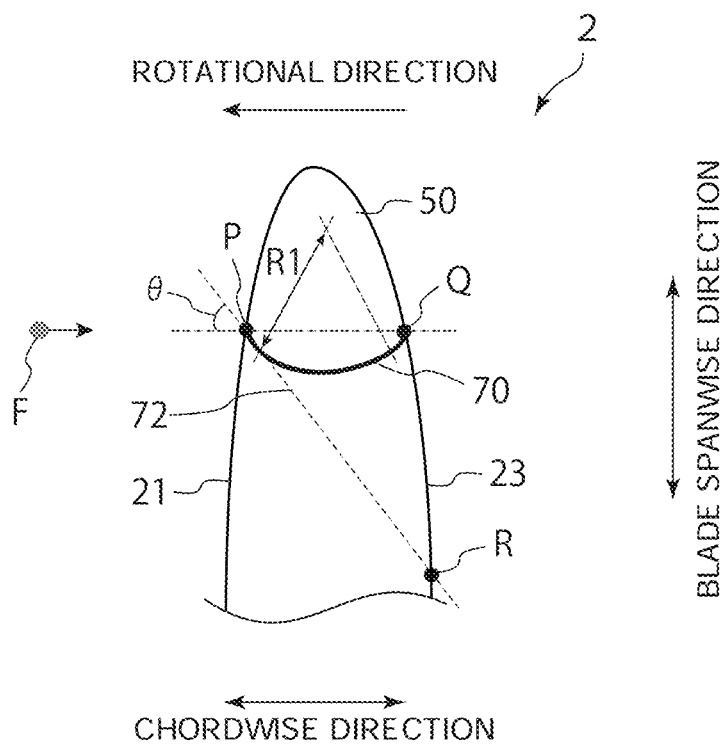
FIG. 8 is a diagram of a blade tip portion of a wind turbine blade according to another embodiment.

In some embodiments, the joint line 70 may have a curved shape having a curvature radius R1 of not more than 0.009 L (R1≤0.009 L), provided that L is the blade length of the wind turbine blade 2 (see FIGS. 2, 8, and 9). With this configuration, the joint line 70 has a curved shape, which makes it possible to suppress weight concentration of the metal receptor 50 toward the leading edge 21 or toward the trailing edge 23, and to ensure a sufficient inclination angle between the chordwise direction and the tangent 72 to the joint line 70 at intersection P between the leading edge 21 and the joint line 70, thus suppressing erosion at the joint line 70 effectively.

Figure 11:
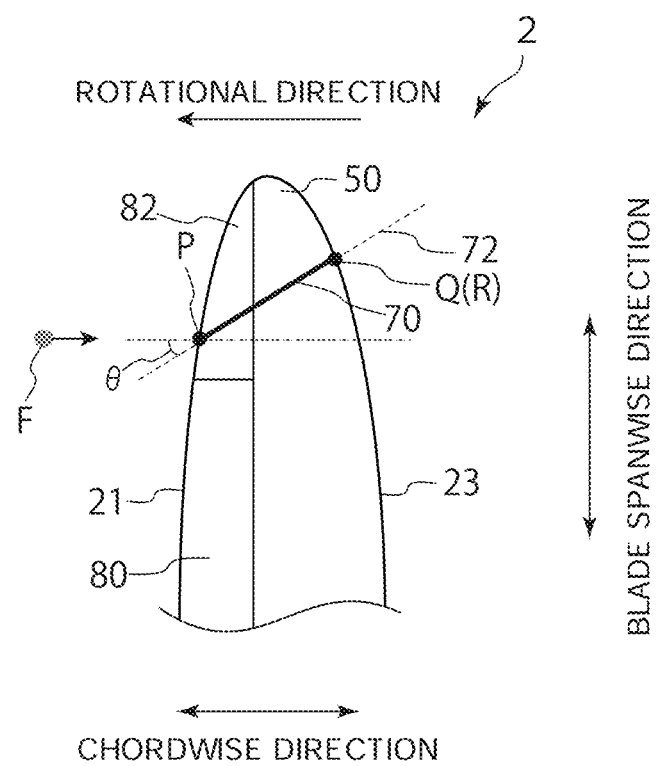
FIG. 11 is a planar view of an anti-erosion layer in some embodiments.

As depicted in FIG. 11, in some embodiments, the wind turbine blade 2 may further include a first anti-erosion layer 80 that covers at least a part of the outer surface of the blade body portion 20.

In some embodiments, the first anti-erosion layer 80 is a protection material having an anti-wear (anti-erosion) property, and may be embodied as a tape, paint, coating, or the like. The first anti-erosion layer 80 is applied or attached to the surface of the blade body portion 20 to protect the blade body portion 20 from collision with the foreign substance F in the air. In some embodiments, the first anti-erosion layer 80 may be a polyurethane coating material (e.g. 3M Wind Blade Protection Coating W4600 of 3M (trademark), a polyurethane coating material of BASF), or a tape with such a polyurethane coating material applied thereto.

With this configuration, the first anti-erosion layer 80 is further provided to cover at least a part of the outer surface of the blade body portion 20, and thereby it is possible to reduce erosion damage to the wind turbine blade 2 more effectively.

As depicted in FIG. 11, in some embodiments, the wind turbine blade 2 may further include a second anti-erosion layer 82 that covers at least a portion of the joint line 70 between the metal receptor 50 and the blade body portion 20, the portion being disposed on the side of the leading edge 21. With the second anti-erosion layer 82 additionally provided, it is possible to cover the portion of the joint line 70 between the metal receptor 50 and the blade body portion 20 on the side of the leading edge 21. Accordingly, it is possible to suppress erosion on the joint line 70 even more effectively.

Figure 12:
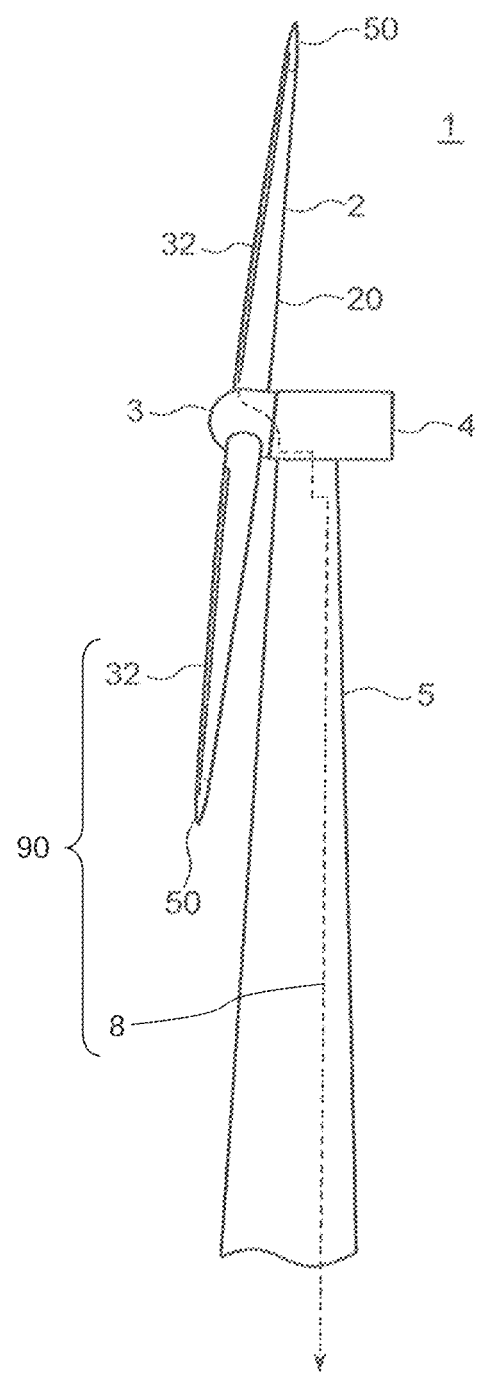
FIG. 12 is a diagram of another configuration example of a wind turbine power generating apparatus.

As depicted in FIG. 12, in some embodiments, the wind turbine blade 2 may further include a lightning-current transmission part 90 which includes at least one of: the metal foil 32 connected to the metal receptor 50 and extending from the connecting section to the metal receptor 50 toward the blade root portion 2A of the wind turbine blade 2; or a down-conductor 8. With this configuration, the lightning-current transmission part 90 including at least one of the metal foil 32 or the down-conductor 8 is provided, and thereby it is possible to exert the lightning-protection performance more reliably while achieving the above described effect to suppress erosion damage to the wind turbine blade 2.

Figure 13:
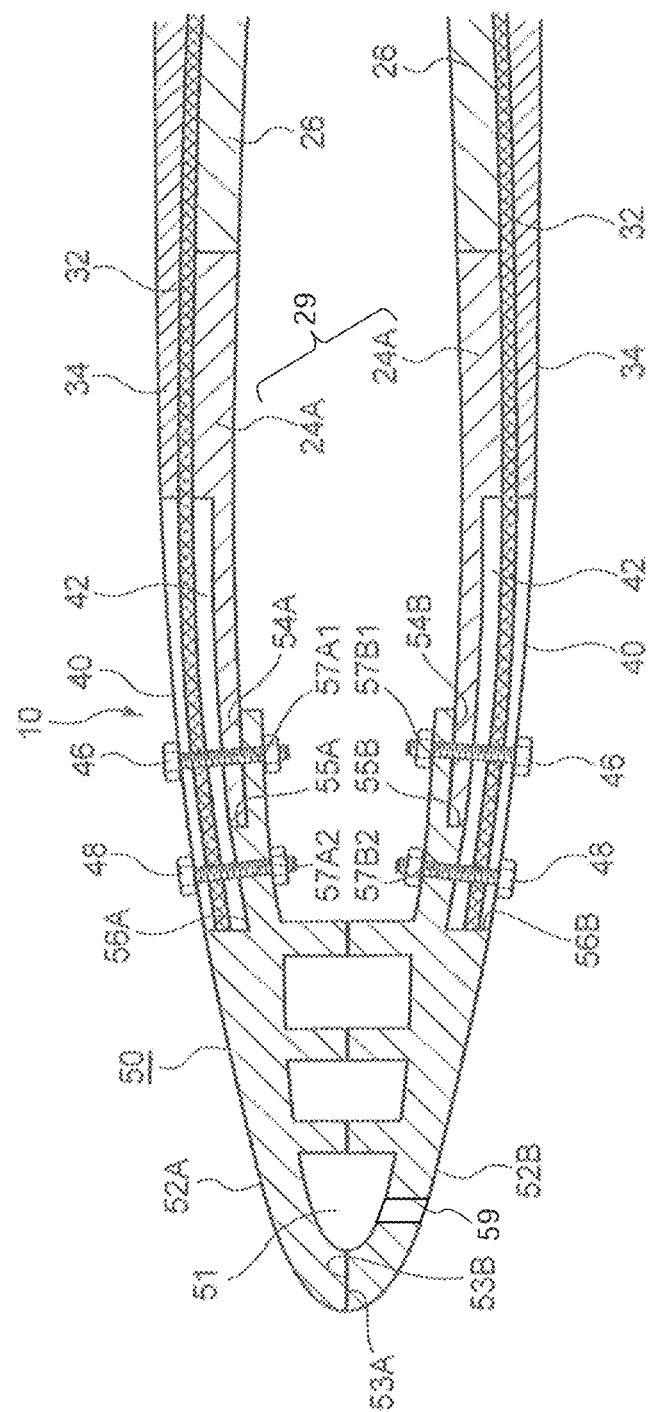
FIG. 13 is a cross-sectional view of a tip side of a wind turbine blade according to an embodiment.

A configuration example of the metal receptor 50 will now be described with reference to FIG. 13. FIG. 13 is a cross-sectional view of a tip side of a wind turbine blade according to an embodiment.

First recessed portions MA, MB, and second recessed portions 56A, 56B are formed on an outer surface of the end portion of the metal receptor 50. The first recessed portions MA, MB and the second recessed portions 56A, 56B are disposed adjacent to each other in the blade-spanwise direction via steps 55A, 55B, respectively. The first recessed portions MA, MB are disposed closer to the blade root portion 2A, and the second recessed portions 56A, 56B are disposed closer to the blade tip portion 2B. The first recessed portions MA, MB are formed to be shallower than the second recessed portions 56A, 56B. Further, bolt holes 57A1, 57B1 are formed on the first recessed portions, and bolt holes 57A2, 57B2 are formed on the second recessed portions. While the first recessed portions 54A, 54B are disposed adjacent to the second recessed portions 56A, 56B in the blade spanwise direction in the present configuration, the configuration of the recessed portions is not limited to this. For instance, the first recessed portions 54A, 54B, and the second recessed portions 56A, 56B may be disposed adjacently in the blade width direction.

In some embodiments, the metal receptor 50 may be formed of copper or copper alloy. Accordingly, with the metal receptor 50 including copper or copper alloy having a high conductivity, it is possible to exert the lightning-protection performance more reliably while achieving the above described effect to suppress erosion damage to the wind turbine blade 2.

In some embodiments, the blade body portion 20 may include a FRP shell 29 connected to the metal receptor 50 in a state of overlapping the metal receptor 50. For instance, as depicted in FIG. 13, at the joint portion 10 between the blade body portion 20 and the metal receptor 50, a fiber-reinforced plastic 24A (FRP) is fastened to the metal receptor 50 in a state where the fiber-reinforced plastic 24A and the metal receptor 50 are at least overlapping, and an end portion of the metal foil 32 is electrically connected to the metal receptor 50. Further, as depicted in FIG. 13, the metal foil 32 is interposed between a first metal plate 40 and a second metal plate 42 at the joint portion 10. The first metal plate 40 and the second metal plate 42 may extend from the joint portion 10 to a midway position of the blade body portion 20.

Furthermore, the first recessed portions 54A, 54B are engaged with the fiber-reinforced plastic 24A that forms the end portion of the blade body portion 20, the second metal plate 42, the metal foil 32 and the first metal plate 40, which are fastened together with bolts 46 screwed into the bolt holes 57A1, 57A2. Accordingly, the blade body portion 20 and the metal receptor 50 are connected. Since the fiber-reinforced plastic 24A and the metal receptor 50 are fastened to each other in a state of at least overlapping with each other, it is possible to achieve a greater contact area between the fiber-reinforced plastic 24A and the metal receptor 50 at the joint portion 10, which makes it possible to maintain a high connection strength that can bear the bending moment of the wind turbine blade 2 generated by wind loads that the wind turbine blade 2 receives, for instance. Furthermore, the first recessed portions 54A, 54B and the fiber-reinforced plastic 24A make surface-contact with each other, which makes it possible to ensure a high connection strength between the blade body portion 20 and the metal receptor 50.

Furthermore, the second recessed portions 56A, 56B are engaged with the second metal plate 42, the metal foil 32 and the first metal plate 40, which are fastened together with bolts 48 screwed into the bolt holes 57A2, 57B2. Accordingly, the metal foil 32 is connected to the metal receptor 50 via the second metal plate 42. Thus, the metal foil 32 and the metal receptor 50 that function as a down-conductor are electrically connected. Since the metal foil 32 is fastened while being overlapped with the metal receptor 50 via the second metal plate 42, the metal foil 32 and the metal foil 50 make electrical connect with each other via a larger electrical-connection area, and thereby it is possible to let lightning current received by the metal receptor 50 flow smoothly to the metal foil 32. Furthermore, the second recessed portions 56A, 56B and the second metal plate 42 make surface-contact with each other, which makes it possible to ensure electrical connection between the metal foil 32 and the metal receptor 50 via the second metal plate 42. With the above configuration, it is possible to achieve the effect to suppress erosion damage to the wind turbine blade 2, mentioned in the above described embodiments, at the connection section between the metal receptor 50 and the FRP shell 29 of a hollow structure that is formed by the fiber-reinforced plastic 24A.

As depicted in FIG. 13, in some embodiments, the metal receptor 50 may include: a first portion 52A that forms the pressure surface 27 on the side of the blade tip portion 2B of the wind turbine blade 2; and a second portion 52B that forms the suction surface 25 on the side of the blade tip portion 2B of the wind turbine blade 2, the second portion 52B being fastened to the first portion 52A. In an embodiment, the first portion 52A of the metal receptor 50 may have a substantially symmetric shape with the second portion 52B. The first portion 52A has a butting surface 53A meeting a butting surface 53B of the second portion 52B, and is fastened to the second portion 52B. A plurality of bolt holes (not depicted) is formed on the butting surface 53A of the first portion 52A, and a plurality of bolt holes (not depicted) is formed on the butting surface 53B of the second portion 52B in positions corresponding to those of the bolt holes on the butting surface 53A. Accordingly, the first portion 52A and the second portion 52B are bolt-fastened while the butting surfaces 53A, 53B are meeting each other. With the metal receptor 50 having a halved shape as described above, it is possible to attach the metal plates 40, 42 and the metal foil 32, for instance, to the metal receptor 50 readily. With this configuration, the metal receptor 50 includes the first portion 52A forming the pressure surface 27 on the side of the blade tip portion 2B and the second portion 52B forming the suction surface 25 on the side of the blade tip portion 2B, and thereby it is possible to facilitate assembly and maintenance works for the blade body portion 20 while achieving the effect to suppress erosion damage to the wind turbine blade 2 as described in the above embodiments.

As depicted in FIG. 13, in some embodiments, the metal receptor 50 may have a cavity 51 formed therein. With the above configuration, the metal receptor 50 has the cavity 51 formed therein, and thereby it is possible to suppress a weight increase of the metal receptor 50 while suppressing erosion on the joint line 70.

As depicted in FIG. 13 for instance, in some embodiments, the metal receptor 50 may have a cavity 51 formed therein and a drain hole 59 communicating with the cavity 51. With this configuration, the metal receptor 50 has the drain hole 59 communicating with the cavity 51 formed inside the metal receptor 50, and thereby it is possible to discharge a foreign substance F like a raindrop that accumulates inside the cavity 51 to outside through the drain hole 59, and thus to suppress erosion damage to the wind turbine blade 2 effectively.

As depicted in FIG. 13, for instance, the second portion 52B has a cavity (recessed portion) 51 that forms an empty section inside the metal receptor 50 in combination with the recessed portion of the first portion 52A, when assembled with the first portion 52A. Further, a drain hole 59 may be provided to be in communication with the cavity 51. The drain 59 is disposed on the tip of the metal receptor 50. If the cavity 51 is divided into a plurality of cavities by the butting surface 53B, grooves may be formed on the butting surface 53B so that the plurality of cavities 51 communicate with each other.

With this configuration, the foreign substance F like a raindrop gathered inside the metal receptor 50 can be smoothly discharged outside through the drain hole 59 from the empty sections formed by the cavities 51.

Further, the first portion 52A may have the same configuration as the second portion 52B.

As described above, according to the above described embodiments, it is possible to provide the wind turbine 1 having the wind turbine blade 2 whereby it is possible to suppress erosion on the joint line 70 effectively.

Embodiments of the present invention were described in detail above, but the present invention is not limited thereto, and various amendments and modifications may be implemented.

DESCRIPTION OF REFERENCE NUMERALS

1 Wind turbine (wind turbine power generating apparatus)
2 Wind turbine blade
2A Blade root portion
2B Blade tip portion
2C Airfoil portion
3 Hub
4 Nacelle
5 Tower
8 Down-conductor
10 Joint portion
20 Blade body portion
21 Leading edge
22 Inner blade-root reinforcement member
23 Trailing edge
24 Airfoil forming member
24A Fiber-reinforced plastic
25 Suction surface
26 Sparcap
27 Pressure surface
28 Insulation layer
29 FRP shell
30 Outer blade-root reinforcement member
32 Metal foil 34 Protection layer
36 Shear web
40 First metal plate
42 Second metal plate
46, 48 Bolt
50 Metal receptor
51 Cavity
52A First portion
52B Second portion
53A, 53B Butting surface
54A, 54B First recessed portion
55A, 55B Step
56A, 56B Second recessed portion
57A1, 57A2, 57B1, 57B2 Bolt hole
59 Drain hole
70 Joint line
72 Tangent
80 First anti-erosion layer
82 Second anti-erosion layer
90 Lightning-current transmission part
F Foreign substance
P, Q, R Intersection

The invention claimed is:

1. A wind turbine blade, comprising:
a blade body portion including a blade root portion to be attached to a hub of a wind turbine, a blade tip portion positioned farthest from the hub, and a blade center portion extending between the blade root portion and the blade tip portion in a blade spanwise direction, wherein the blade body portion has a leading edge and a trailing edge extending from the blade root portion to the blade tip portion and a blade chordwise direction is the direction along a chord connecting the leading edge and the trailing edge; and
a metal receptor forming a blade tip of the wind turbine blade,
wherein the metal receptor is self-contained and selectively connectable to and removable from the blade body portion,
wherein the blade body portion has a hollow structure and forms an airfoil shape in the blade tip portion of the wind turbine blade with the metal receptor in a joint region to the metal receptor,
wherein, as seen in a blade-thickness direction of the wind turbine blade which is perpendicular to both of the spanwise direction and the chordwise direction, a tangent to a joint line between the metal receptor and the blade body portion at an intersection between the joint line and the leading edge of the wind turbine blade is inclined from the chordwise direction of the wind turbine blade so as to get closer to the blade tip with distance from the leading edge toward the trailing edge of the wind turbine blade.

2. The wind turbine blade according to claim 1, wherein the metal receptor has a length along the blade spanwise direction, and wherein the length is either at least 0.1% and not more than 0.9% of a blade length of the wind turbine blade or at least 50 mm and not more than 700 mm.

3. The wind turbine blade according to claim 1, wherein the metal receptor has a width along the chordwise direction, and wherein the width is either at least 0.25% and not more than 0.9% of a blade length of the wind turbine blade or at least 200 mm and not more than 700 mm.

4. The wind turbine blade according to claim 1, wherein the joint line has a curved shape with a curvature radius of not more than 0.009 L, provided that L is a blade length of the wind turbine blade.

5. The wind turbine blade according to claim 1, further comprising a first anti-erosion layer covering at least a part of an outer surface of the blade body portion.

6. The wind turbine blade according to claim 1, further comprising a second anti-erosion layer covering at least a portion of the joint line between the metal receptor and the blade body portion, the portion being disposed on a side of the leading edge.

7. The wind turbine blade according to claim 1, further comprising a lightning-current transmission part including at least one of: a metal foil which is connected to the metal receptor and which extends from a connection section to the metal receptor toward the blade root portion of the wind turbine blade; or a down-conductor.

8. The wind turbine blade according to claim 1, wherein the blade body portion includes a fiber-reinforced plastic shell connected to the metal receptor while overlapping the metal receptor.

9. The wind turbine blade according to claim 1, wherein the metal receptor includes:
a first portion forming a pressure surface on a side of the blade tip of the wind turbine blade; and
a second portion forming a suction surface on the side of the blade tip of the wind turbine blade, the second portion being fastened to the first portion.

10. The wind turbine blade according to claim 1, wherein the metal receptor comprises copper or copper alloy.

11. A wind turbine power generating apparatus comprising the wind turbine blade according to claim 1.

12. A wind turbine blade, comprising:
a blade body portion including a blade root portion to be attached to a hub of a wind turbine, a blade tip portion positioned farthest from the hub, and a blade center portion extending between the blade root portion and the blade tip portion in a blade spanwise direction, wherein the blade body portion has a leading edge and a trailing edge extending from the blade root portion to the blade tip portion and a blade chordwise direction is the direction along a chord connecting the leading edge and the trailing edge; and
a metal receptor forming a blade tip of the wind turbine blade, wherein the blade body portion is connected to the metal receptor so as to be positioned on a blade-root side of the metal receptor,
wherein the blade body portion has a hollow structure and forms an airfoil shape in the blade tip portion of the wind turbine blade with the metal receptor in a joint region to the metal receptor,
wherein, as seen in a blade-thickness direction of the wind turbine blade which is perpendicular to both of the spanwise direction and the chordwise direction, a tangent to a joint line between the metal receptor and the blade body portion at an intersection between the joint line and the leading edge of the wind turbine blade is inclined from the chordwise direction of the wind turbine blade so as to get closer to the blade tip with distance from the leading edge toward the trailing edge of the wind turbine blade,
wherein the metal receptor has a cavity inside the metal receptor.

13. The wind turbine blade according to claim 12, wherein the metal receptor includes a drain hole which is in communication with the cavity.

14. The wind turbine blade according to claim 12, further comprising a first anti-erosion layer covering at least a part of an outer surface of the blade body portion.

15. The wind turbine blade according to claim 12, further comprising a second anti-erosion layer covering at least a portion of the joint line between the metal receptor and the blade body portion, the portion being disposed on a side of the leading edge.

16. The wind turbine blade according to claim 12, further comprising a lightning-current transmission part including at least one of: a metal foil which is connected to the metal receptor and which extends from a connection section to the metal receptor toward the blade root portion of the wind turbine blade; or a down-conductor.

17. The wind turbine blade according to claim 12,
wherein the blade body portion includes a fiber-reinforced plastic shell connected to the metal receptor while overlapping the metal receptor.

18. A wind turbine blade, comprising:
a blade body portion including a blade root portion to be attached to a hub of a wind turbine, a blade tip portion positioned farthest from the hub, and a blade center portion extending between the blade root portion and the blade tip portion in a blade spanwise direction, wherein the blade body portion has a leading edge and a trailing edge extending from the blade root portion to the blade tip portion and a blade chordwise direction is the direction along a chord connecting the leading edge and the trailing edge; and
a metal receptor forming at least a section of the blade tip portion, the metal receptor defining a blade tip of the wind turbine blade, and wherein a cross section of the blade tip portion that includes the metal receptor is formed of metal throughout the cross section of the blade tip portion,
wherein the blade body portion is connected to the metal receptor so as to be positioned on a blade-root side of the metal receptor,
wherein the blade body portion has a hollow structure and forms an airfoil shape in the blade tip portion of the wind turbine blade with the metal receptor in a joint region to the metal receptor,
wherein, as seen in a blade-thickness direction of the wind turbine blade which is perpendicular to both of the spanwise direction and the chordwise direction, a tangent to a joint line between the metal receptor and the blade body portion at an intersection between the joint line and the leading edge of the wind turbine blade is inclined from the chordwise direction of the wind turbine blade so as to get closer to the blade tip with distance from the leading edge toward the trailing edge of the wind turbine blade.

19. The wind turbine blade according to claim 18, further comprising a first anti-erosion layer covering at least a part of an outer surface of the blade body portion.

20. The wind turbine blade according to claim 18, further comprising a second anti-erosion layer covering at least a portion of the joint line between the metal receptor and the blade body portion, the portion being disposed on a side of the leading edge.

21. The wind turbine blade according to claim 18, further comprising a lightning-current transmission part including at least one of: a metal foil which is connected to the metal receptor and which extends from a connection section to the metal receptor toward the blade root portion of the wind turbine blade; or a down-conductor.

22. The wind turbine blade according to claim 18,
wherein the blade body portion includes a fiber-reinforced plastic shell connected to the metal receptor while overlapping the metal receptor.

* * * * *